United States Patent [19]

Yamamoto

[11] Patent Number: 5,004,268
[45] Date of Patent: Apr. 2, 1991

[54] MECHANISM FOR POSITIONAL ADJUSTMENT OF ANCHOR FOR WEBBING IN PASSIVE SEAT BELT SYSTEM FOR VEHICLE

[75] Inventor: Kazuo Yamamoto, Sagamihara, Japan

[73] Assignee: Nippon Seiko Kabushiki Kaisha, Tokyo, Japan

[21] Appl. No.: 427,689

[22] Filed: Oct. 27, 1989

[30] Foreign Application Priority Data

Oct. 28, 1988 [JP] Japan ............................ 63-140900[U]

[51] Int. Cl.⁵ ............................................ B60R 22/00
[52] U.S. Cl. .................................................. 280/804
[58] Field of Search ...................... 280/801, 804, 808; 297/473, 482, 483

[56] References Cited

U.S. PATENT DOCUMENTS

| 4,456,283 | 6/1984 | Michael et al. | 280/804 |
| 4,597,588 | 7/1986 | Kawai | 280/808 |
| 4,632,426 | 12/1986 | Dallwig et al. | 280/808 |
| 4,653,774 | 3/1987 | Morner | 280/804 |
| 4,750,758 | 6/1988 | Yamamoto et al. | 280/804 |

Primary Examiner—Richard A. Bertsch
Attorney, Agent, or Firm—Wegner, Cantor, Mueller & Player

[57] ABSTRACT

A mechanism for the positional adjustment of an anchor for a webbing in a passive seat belt system for a vehicle is described. The mechanism includes a slide rail for guiding a slider which carries the webbing fastened thereon, an adjustment base fitted on the slide rail and defining a plurality of interlocking holes at predetermined longitudinal intervals therein, an anchor base transversely surrounding the slide rail and adjustment base for guided movement along the slide rail and adjustment base, said anchor base being engageable with the slider at an occupant-restraining position, and a latch engageable with one of the plural holes formed in the adjustment base so as to lock the anchor base on the adjustment base, thereby determining the position of the anchor base relative to the adjustment base.

7 Claims, 5 Drawing Sheets

MECHANISM FOR POSITIONAL ADJUSTMENT OF ANCHOR FOR WEBBING IN PASSIVE SEAT BELT SYSTEM FOR VEHICLE

BACKGROUND OF THE INVENTION (1) Field of the Invention

This invention relates to a passive seat belt system for a vehicle, more specifically to a mechanism for the positional adjustment of an anchor for a webbing in a passive seat belt system, and especially to a mechanism for permitting adjustment of the height of a webbing anchor relative to the outboard shoulder of an occupant in a passive seat belt system for a vehicle.

(2) Description of the Related Art

A passive seat belt system for a vehicle serves to restrain and protect an occupant by fastening a webbing in the event of a vehicular emergency such as a collision. As illustrated in FIG. 10, the conventional passive seat belt system is designed to support the webbing by an anchor base provided adjacent the outboard shoulder of the occupant when the seat belt system is in use.

The sitting height and other physical constitution vary widely from one occupant to another, who use a seat belt system. It is therefore necessary from the viewpoint of safety to permit adjustment of the position of attachment of the anchor base which supports the shoulder webbing in the vicinity of the outboard shoulder of the occupant. If the anchor base for the shoulder webbing is positioned too high, the webbing extends over his face or neck. If it is positioned too low on the other hand, the webbing gets out from his outboard shoulder and extends over his outboard arm. Whichever the case may be, there is the potential danger that the webbing may not be able to protect the occupant effectively in the event of an emergency. To solve this problem, a mechanism is provided to permit adjustment of the position, typically, the height of the anchor base.

In such a conventional adjustment mechanism, an adjustment base which serves to transmit to a vehicle body a load applied to the anchor base in the event of a collision is mounted on a center pillar of the vehicle body. A slide rail and the anchor base are provided either forwardly or rearwardly of the adjustment base. This has made the adjustment mechanism wider and thicker. If the adjustment mechanism is designed to bear the load of a collision by the slide rail without using any adjustment base, it is necessary to thicken the aluminum material of the slide rail to enhance the strength of the slide rail. Moreover, it is also necessary to form, in the slide rail, plural holes for the positional adjustment of the anchor base. Such a design therefore requires complex machining steps.

SUMMARY OF THE INVENTION

It is therefore an object of this invention to realize a compact and easy-to-machine mechanism for the positional adjustment of an anchor for a webbing by reducing the width and thickness of the mechanism and the thickness of the slide rail and also obviating the formation of holes in the slide rail.

In one aspect of this invention, there is thus provided a mechanism for the positional adjustment of an anchor for a webbing in a passive seat belt system for a vehicle, comprising:

a slide rail for guiding a slider which carries the webbing fastened thereon;

an adjustment base fitted on the slide rail and defining a plurality of interlocking holes at predetermined longitudinal intervals therein;

an anchor base transversely surrounding the slide rail and adjustment base for guided movement along the slide rail and adjustment base, said anchor base being engageable with the slider at an occupant-restraining position; and a latch engageable with one of the plural holes formed in the adjustment base so as to lock the anchor base on the adjustment base, thereby determining the position of the anchor base relative to the adjustment base.

According to the present invention, each load applied to the anchor base is born by the slide rail and the adjustment base which overlies the slide rail. It is therefore possible to reduce the width and height of the adjustment mechanism.

The forward component of a load applied to the slider from the webbing, said component being directed toward the front of the vehicle is transmitted in the order of the slider, the anchor base, the slide rail, attachment brackets for the rail, attachment bolts, and the vehicle body. On the other hand, the downward component of the load is transmitted in the order of the slider, the anchor base, the latch, the adjustment base, an attachment bracket, and the vehicle body.

The mechanism according to the present invention can be fabricated in smaller dimensions, i.e., with reduced width and thickness. The slide rail can be formed of a thinner material. Furthermore, only a little machining is needed for the slide rail. This invention therefore has the advantage that a low-cost and compact mechanism has been realized for the positional adjustment of an anchor for a webbing in a passive seat belt system for a vehicle.

BRIEF DESCRIPTION OF THE DRAWINGS

The above and other objects, features and advantages of the present invention will become apparent from the following description of the invention and the appended claims, taken in conjunction with the accompanying drawings, in which;

DETAILED DESCRIPTION OF THE INVENTION AND PREFERRED EMBODIMENT

Figure 1:
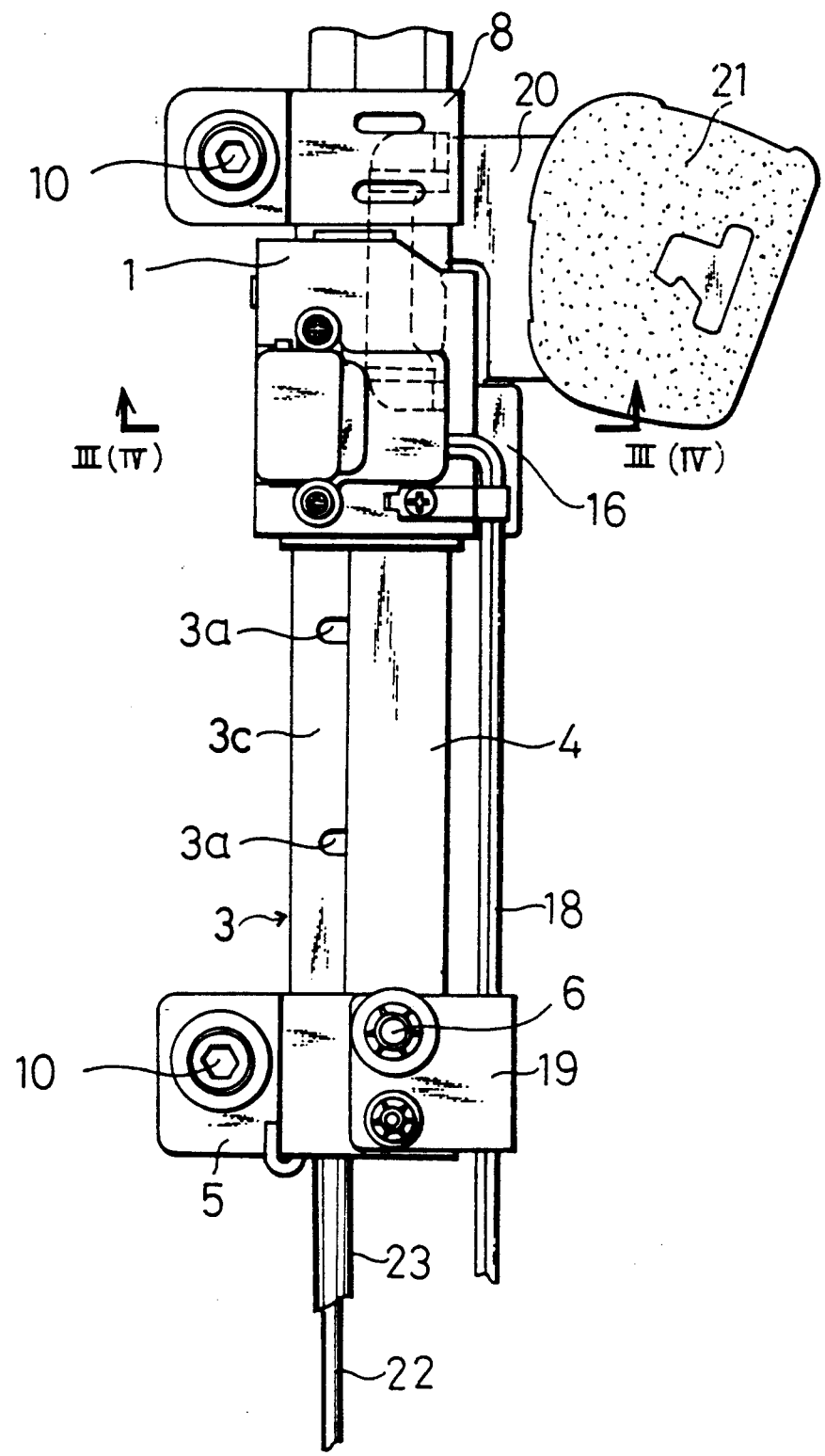
FIG. 1 is a front view of a mechanism according to one embodiment of the present invention for the positional adjustment of an anchor for a webbing in a passive seat belt system for a vehicle, in which an anchor base is in an upper position.
Figure 2:
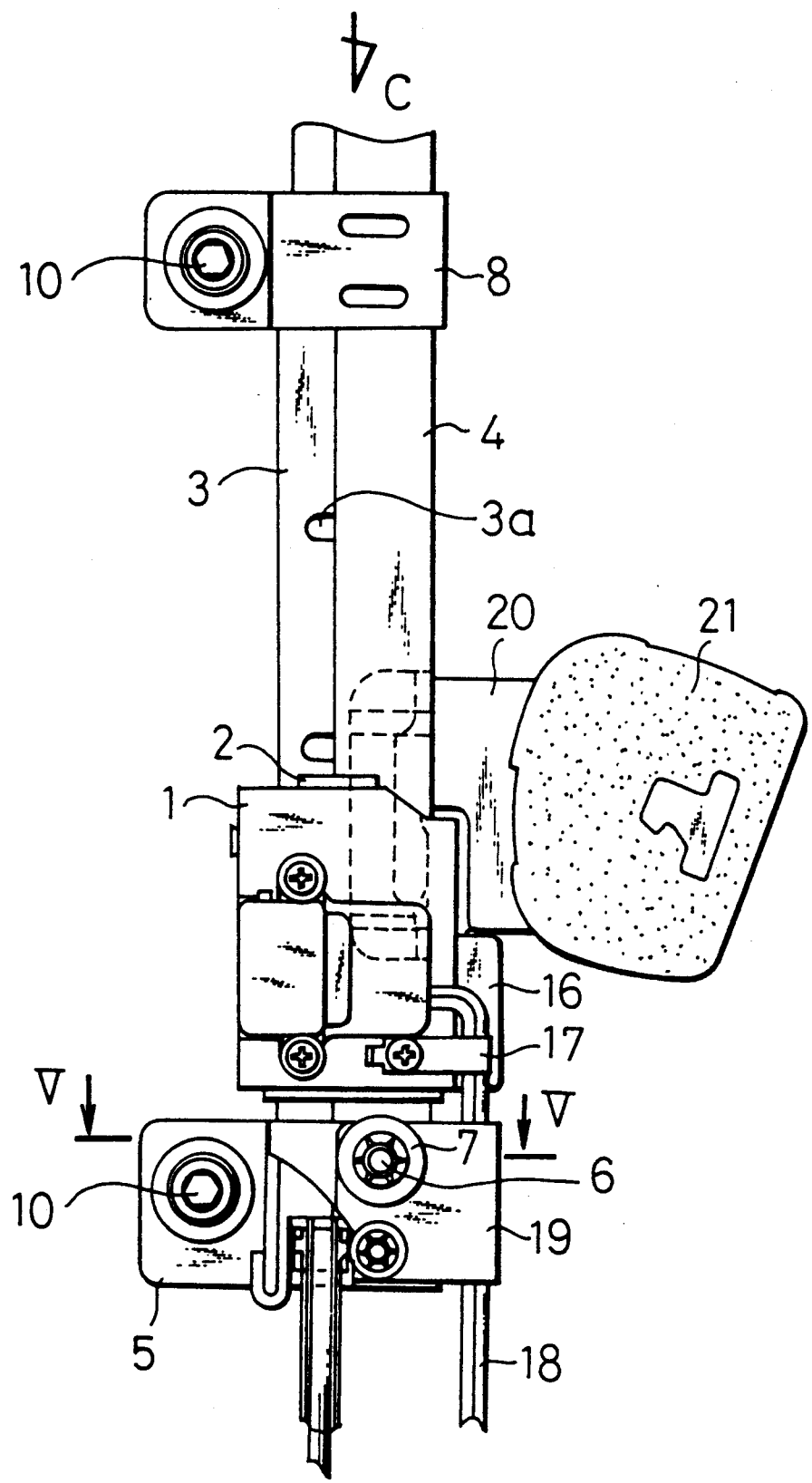
FIG. 2 is similar to FIG. 1, but showing the anchor base in a lower position.
Figure 3:
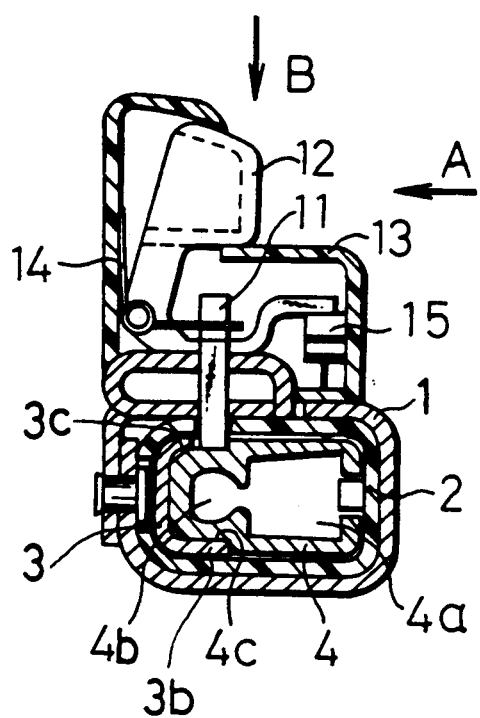
FIG. 3 is a transverse cross-sectional view of the anchor base and its adjacent members taken in the direction of arrows III—III of FIG. 1, showing the anchor base latched on an adjustment base.
Figure 4:
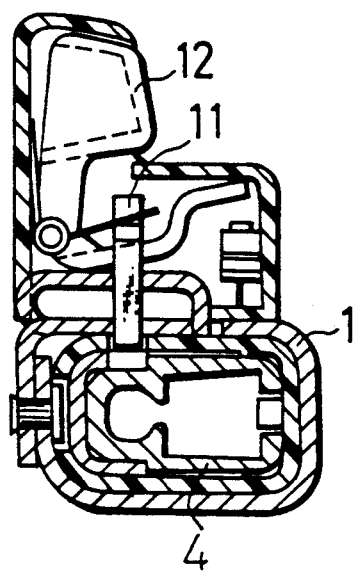
FIG. 4 is a transverse cross-sectional view of the anchor base and its adjacent members taken in the direction of arrows IV—IV of FIG. 1, showing the anchor base unlatched on the adjustment base.
Figure 5:
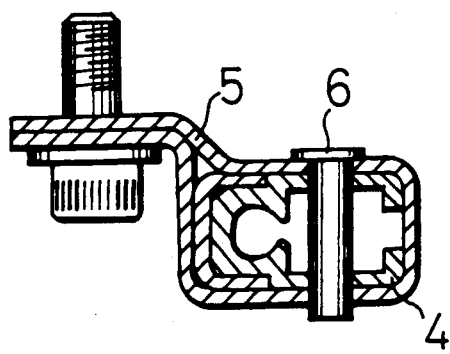
FIG. 5 is a transverse cross-sectional view of the anchor base and its adjacent members taken in the direction of arrows V—V of FIG. 2.
Figure 6:
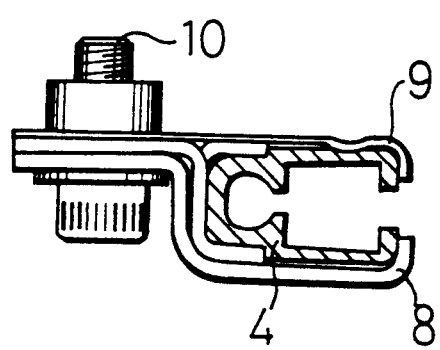
FIG. 6 is a view taken in the direction of arrow C of FIG. 2, in which a slide rail is shown in transverse cross-section.

Referring first to FIGS. 1-6, a mechanism for the positional adjustment of an anchor base for a webbing in a passive seat belt system for a vehicle is mounted on a left-hand center pillar or the like of the vehicle. An adjustment base 3 which is preferably formed of a steel plate is fitted, in an overlying relationship, on a slide rail 4 which is preferably formed of an aluminum material. The slide rail 4 internally defines a first channel 4a for guiding a slider 20 therethrough and a second channel 4b for guiding therethrough a drive member 22 which will be described subsequently. The first and second channels 4a,4b extend in parallel to each other. A sunken portion 4c (see FIG. 3) is formed in the outer surface of the slide rail 4, so that as viewed in a transverse cross-section, the slide rail 4 has a contour substantially equal to a shape obtained by taking away a rectangle from each of two adjacent corners of a larger rectangle. On the other hand, the adjustment base 3 is formed of a sheet material having a substantially U-shaped cross-section with a pair of side wall portions 3b,3c. The paired side wall portions of the adjustment base 3 are fitted on the corresponding corners of the slide rail 4, whereby the slide rail 4 and adjustment base 3 are combined together with the side wall portions being received in the corresponding corners of the slide rail to make up a substantially complete rectangular contour as a whole. Owing to this structure, there is substantially no step between the outer wall of each of the side wall portions of the adjustment base 3 and the outer wall of the corresponding side wall of the slide rail 4. The adjustment base 3 is therefore simply fitted on a part of the outer wall of the slide rail 4 and is not fixed thereon by welding or the like. As depicted in FIGS. 5 and 6, the adjustment base 3 is mounted on the center pillar or the like of the vehicle by brackets 5,8,9 and a bolt 10. A load applied to the anchor base, which is designated at numeral 1, via an ERB (emergency release buckle) 21 and the slider 20 is therefore transmitted to the vehicle body by way of the slide rail 4, adjustment base 3, bracket 5 and bracket 8.

The anchor base 1 shown in cross-section in FIGS. 3 and 4 has been formed by folding, for example, a steel plate in such a way that the adjustment base 3 and slide rail 4 are transversely surrounded by the resultant anchor base 1. Accordingly, the cross-sectional shape of the anchor base 1 is rectangular. Above the above-mentioned rectangular portion as viewed in FIGS. 3 and 4, another rectangular portion is also formed in a similar manner to accommodate a latch 11.

Provided on the anchor base 1 is a button 12 for operating the latch 11 and a switch 15. The latch 11 serves to lock the anchor base 1 on the adjustment base 3. The switch 15 serves to temporarily shift the slider 20 upwards upon positional adjustment of the anchor base 1.

Interposed between the anchor base 1 and slide rail 4 is a spacer 2 which is made of a resin material and serves as a slide member for reducing the frictional resistance and also as a means for preventing the occurrence of sliding noise. After the spacer 2 is inserted in the anchor base 1, it is prevented from slipping off from the anchor base 1 by means of an unillustrated slip-off preventing means.

Figure 7:
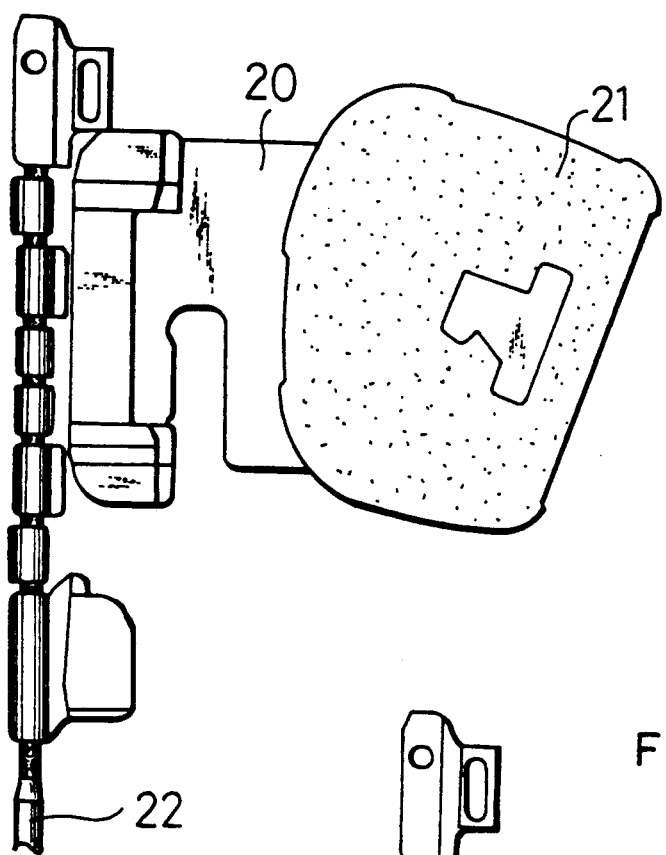
FIG. 7 illustrates the positional relationship between a drive cable and the slider when the passive seat belt system is in use.
Figure 8:
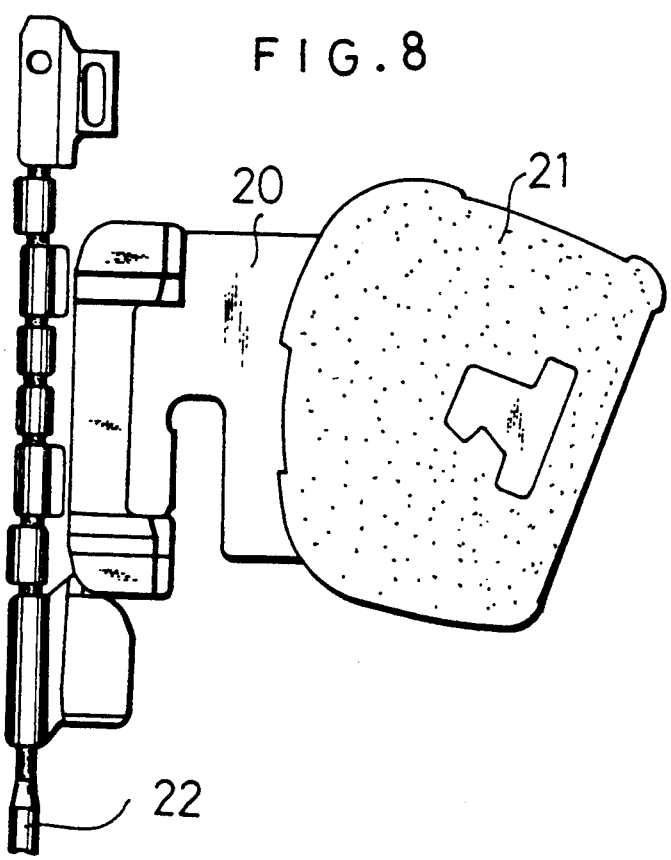
FIG. 8 is similar to FIG. 7, but showing the positional relationship between the drive cable and the slider when the passive seat belt system is not in use.
Figure 9:
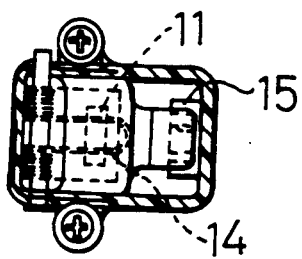
FIG. 9 is a partly-sectional plan view of a latch portion.
Figure 10:
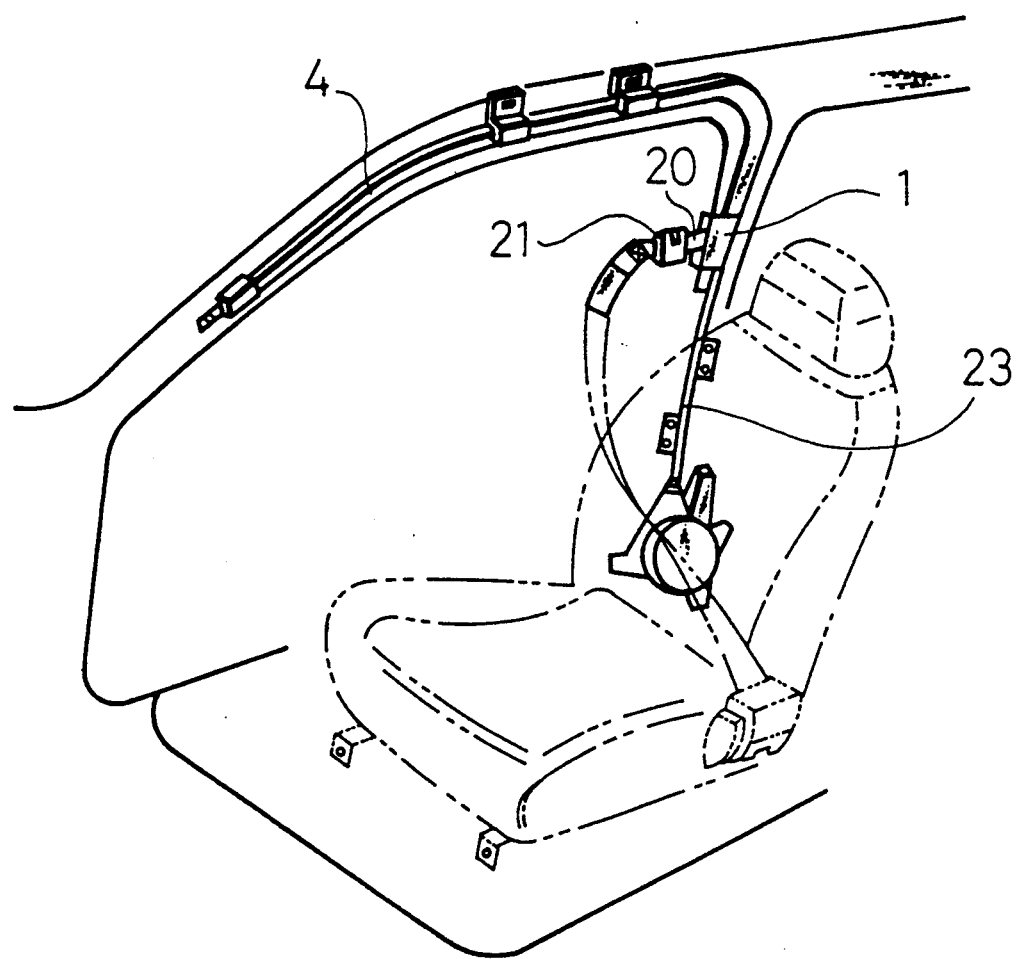
FIG. 10 is a schematic illustration of the overall structure of the passive seat belt system for the vehicle.

A drive cable 22 serves as a drive member for causing the ERB 21 to travel along the slide rail 4, while an outer tube 23 serves as a guide for the drive cable 22. For restraining an occupant, the slider 20 is downwardly pulled by the drive cable 22 as shown in FIG. 7. To release the occupant on the other hand, the slider 20 is upwardly pushed by the drive cable 22.

The construction of the adjustment mechanism will next be described in the order of its assembly.

After attachment of the spacer 2 in the anchor base 1, the slide rail 4 with the adjustment base 3 fitted thereon is inserted into the anchor base 1. The adjustment base 3 and slide rail 4 are inserted into the bracket 5. A pin 6 which serves to connect the slide rail 4 and bracket 5 is then caused to extend through holes formed in the slide rail 4 and bracket 5 (see FIG. 6). The pin 6 is secured there by a push nut 7. Next, the brackets 8,9 are attached and fixed on the center pillar or the like of the vehicle body by the bolt 10 (see FIG. 6), whereby the adjustment base 3 and slide rail 4 are connected into an integral unit and the anchor base 1 is allowed to move up and down.

On the anchor base 1, there are the latch 11, the button 12, a cover 13, a spring 14 biasing the latch 11 in the direction of engagement with the adjustment base 3, and the switch 15. They are assembled together to complete the assembly of the anchor base 1. Then, a slider stop switch 16 is attached and a switch cord 18 is placed on a cord holder 17, whereby the adjustment mechanism is completed.

Finally, the operation of the adjustment mechanism will be described. In the state shown in FIG. 3, the button 12 is pressed in the direction indicated by arrow A to lift the latch 11 into the position depicted in FIG. 4. At the same time, the switch 15 is actuated so that the slider 20 is caused to move upwards over a predetermined distance. This renders the anchor base 1 movable. Substantially U-shaped interlocking holes 3a are formed at predetermined longitudinal intervals through one of the side wall portions of the adjustment base 3, said one side wall portion being the one located adjacent the latch 11. It is hence possible to adjust the position of the upper anchorage of the shoulder webbing in accordance with the physical constitution of each occupant by locking the latch 11 in the interlocking hole 3a at the most desired position.

I claim:

1. A mechanism for the positional adjustment of an anchor for a webbing in a passive seat belt system adapted to be mounted in a vehicle, comprising:

a slide rail for guiding a slider which carries the webbing fastened thereon;

an adjustment base fitted on the slide rail so that the adjustment base overlies in a contiguous relation a part of the outer periphery of the slide rail, said adjustment base defining a plurality of interlocking holes at predetermined longitudinal intervals therein and having a first surface and a second surface, said first surface extending in a lengthwise direction of the vehicle when the adjustment base is mounted on the vehicle and said second surface extending substantially at a right angle relative to the first surface;

an anchor base transversely surrounding the slide rail and adjustment base for guided movement along the slide rail and adjustment base, said anchor base being engageable with the slider at an occupant-restraining position; and a latch supported of the adjustment base and engageable with one of the plural holes formed in the adjustment base so as to lock the anchor base on the adjustment base, thereby determining the position of the anchor base relative to the adjustment base.

2. The mechanism as claimed in claim 1, wherein a sunken portion is formed in the outer periphery of the slide rail and the adjustment base is fitted in the sunken portion, whereby the outer peripheral surfaces of the slide rail and adjustment base lie in substantially the same plane when combined together.

3. The mechanism as claimed in claim 2, wherein when combined together, the slide rail and adjustment base have a substantially rectangular transverse cross-section.

4. The mechanism as claimed in claim 1, wherein as viewed in a transverse cross-section, the slide rail has a contour substantially equal to a shape obtained by taking away a rectangle from each of two adjacent corners of a larger rectangle, the adjustment base is formed of a sheet material having a substantially U-shaped cross-section with a pair of side wall portions, and the slide rail and adjustment base are combined together with the side wall portions being received in the corresponding corners of the slide rail to make up a substantially complete rectangular contour as a whole.

5. The mechanism as claimed in claim 4, wherein the interlocking holes engageable with the latch are formed in one of the side wall portions.

6. The mechanism as claimed in claim 5, wherein the latch is slidable in a direction extending through said one of the side wall portions.

7. The mechanism as claimed in claim 1, wherein the slide rail defines a first channel for guiding the slider therethrough and a second channel for guiding a drive member adapted to drive the slider, the first and second channels extend in parallel to each other, and the adjustment base is provided outside the second channel.

* * * * *